United States Patent
Stuart et al.

(10) Patent No.: US 11,156,097 B2
(45) Date of Patent: Oct. 26, 2021

(54) TURBOMACHINE HAVING AN AIRFLOW MANAGEMENT ASSEMBLY

(71) Applicant: General Electric Company, Schenectady, NY (US)

(72) Inventors: Alan Roy Stuart, Cincinnati, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 16/280,596

(22) Filed: Feb. 20, 2019

(65) Prior Publication Data

US 2020/0263550 A1 Aug. 20, 2020

(51) Int. Cl.
| | | |
|---|---|---|
| *F01D 25/24* | (2006.01) | |
| *F01D 5/14* | (2006.01) | |
| *F01D 11/02* | (2006.01) | |
| *F02K 3/06* | (2006.01) | |
| *F02C 7/28* | (2006.01) | |

(52) U.S. Cl.
CPC ............. *F01D 5/142* (2013.01); *F01D 11/02* (2013.01); *F01D 25/24* (2013.01); *F02C 7/28* (2013.01); *F02K 3/06* (2013.01); *F05D 2240/14* (2013.01); *F05D 2240/301* (2013.01); *F05D 2240/55* (2013.01); *F05D 2260/606* (2013.01)

(58) Field of Classification Search
CPC .......... F01D 25/24; F01D 5/142; F01D 11/02; F01D 5/06; F01D 5/084; F01D 11/003; F01D 11/00
See application file for complete search history.

(56) References Cited

U.S. PATENT DOCUMENTS

| | | | |
|---|---|---|---|
| 3,363,831 A | 1/1968 | Garnier | |
| 3,703,081 A | 11/1972 | Krebs et al. | |
| 4,098,127 A | 7/1978 | Shiga et al. | |
| 4,274,804 A * | 6/1981 | Teshima | F01D 25/32 415/121.2 |
| 4,621,978 A | 11/1986 | Stuart | |
| 4,860,537 A | 8/1989 | Taylor | |
| 4,879,792 A | 11/1989 | O'Connor | |
| 4,969,325 A | 11/1990 | Adamson et al. | |
| 4,976,102 A | 12/1990 | Taylor | |
| 5,167,167 A | 12/1992 | Tiernan, Jr. et al. | |
| 5,272,868 A | 12/1993 | Ciokajlo et al. | |
| 5,361,580 A * | 11/1994 | Ciokajlo | F01D 25/162 60/226.1 |
| 5,537,861 A | 7/1996 | Seitelman et al. | |
| 5,724,271 A | 3/1998 | Bankert et al. | |
| 5,910,094 A * | 6/1999 | Kraft | B64D 29/00 277/419 |
| 6,126,391 A | 10/2000 | Atragliji et al. | |

(Continued)

*Primary Examiner* — Michael L Sehn
(74) *Attorney, Agent, or Firm* — Dority & Manning, P.A.

(57) ABSTRACT

A gas turbine engine includes a compressor and a turbine; a plurality of rotor blades positioned in the compressor or the turbine and arranged in a plurality of stages along an axial direction; an outer drum positioned at least partially radially outward of the plurality of rotor blades and rotatable with the plurality of rotor blades; and a casing extending over the outer drum and defining a plurality of air cavities with the outer drum, the plurality of air cavities arranged in series airflow communication along the axial direction.

18 Claims, 8 Drawing Sheets

(56) References Cited

U.S. PATENT DOCUMENTS

| | | |
|---|---|---|
| 6,619,030 B1 | 9/2003 | Seda et al. |
| 6,666,017 B2 | 12/2003 | Prentice et al. |
| 6,739,120 B2 | 5/2004 | Moniz et al. |
| 6,976,679 B2 | 12/2005 | Goss et al. |
| 7,048,496 B2 * | 5/2006 | Proctor .............. F01D 1/26 415/115 |
| 7,195,446 B2 | 3/2007 | Seda et al. |
| 7,437,877 B2 * | 10/2008 | Kawamoto .......... F02K 3/04 415/199.6 |
| 7,458,202 B2 | 12/2008 | Moniz et al. |
| 7,490,461 B2 | 2/2009 | Moniz et al. |
| 7,493,753 B2 | 2/2009 | Moniz et al. |
| 7,854,584 B2 | 12/2010 | Lusted et al. |
| 7,905,083 B2 | 3/2011 | Orlando et al. |
| 7,921,634 B2 | 4/2011 | Orlando et al. |
| 7,937,927 B2 | 5/2011 | Suciu et al. |
| 7,966,806 B2 | 6/2011 | Henry et al. |
| 8,172,512 B2 | 5/2012 | Short et al. |
| 8,191,352 B2 * | 6/2012 | Schilling .............. F01D 5/06 60/268 |
| 8,736,120 B2 | 5/2014 | Maeda et al. |
| 8,784,045 B2 | 7/2014 | Zoric et al. |
| 8,887,564 B2 | 11/2014 | Harrison |
| 8,950,171 B2 | 2/2015 | Suciu et al. |
| 9,028,200 B2 | 5/2015 | Suciu et al. |
| 9,080,512 B2 | 7/2015 | Suciu et al. |
| 9,217,331 B1 | 12/2015 | Yellapragada et al. |
| 9,525,321 B2 | 12/2016 | Yamanaka et al. |
| 9,689,314 B2 | 6/2017 | Lemarchand et al. |
| 9,695,751 B2 | 7/2017 | Kupratis et al. |
| 9,718,536 B2 | 8/2017 | Danielson et al. |
| 9,885,249 B2 | 2/2018 | Munsell et al. |
| 10,047,608 B2 | 8/2018 | Phylip-Jones et al. |
| 10,060,357 B2 | 8/2018 | Adams et al. |
| 2010/0196139 A1 | 8/2010 | Beeck et al. |
| 2015/0308282 A1 * | 10/2015 | Bacic .............. F01D 9/02 415/116 |
| 2016/0298539 A1 | 10/2016 | Roberge |
| 2016/0298751 A1 | 10/2016 | Mccune |
| 2017/0051678 A1 * | 2/2017 | Becker, Jr. .......... F01D 9/065 |
| 2017/0314418 A1 | 11/2017 | Lighty et al. |
| 2018/0045060 A1 * | 2/2018 | Matsuo .............. F01D 9/02 |
| 2018/0058569 A1 | 3/2018 | Slayter et al. |
| 2018/0094589 A1 | 4/2018 | Auker et al. |
| 2018/0128168 A1 | 5/2018 | Suciu et al. |
| 2018/0141643 A1 | 5/2018 | Fages |
| 2018/0163845 A1 | 6/2018 | van der Merwe et al. |
| 2018/0209290 A1 | 7/2018 | Port |
| 2018/0209335 A1 | 7/2018 | Stuart et al. |
| 2018/0223732 A1 | 8/2018 | Clements et al. |
| 2018/0274527 A1 | 9/2018 | Snell |

\* cited by examiner

TURBOMACHINE HAVING AN AIRFLOW MANAGEMENT ASSEMBLY

FIELD

The present subject matter relates generally to a turbomachine, and more particularly, to a turbomachine having an airflow management assembly for receiving, e.g., high pressure airflow leakage.

BACKGROUND

Gas turbine engines generally include a turbine section downstream of a combustion section that is rotatable with a compressor section to rotate and operate the gas turbine engine to generate power, such as propulsive thrust. Certain gas turbine engines further include a fan driven by a turbine within the turbine section, such as a low pressure turbine of the turbine section.

Moreover, at least certain gas turbine engines include a plurality of counterrotating rotor blades in at least one of a compressor of the compressor section or a turbine of the turbine section. With at least some of these compressors and turbines having counterrotating rotor blades, an airflow leakage can be more than desirable. When the airflow through the compressor or turbine leaks out, an efficiency of the compressor or turbine may be reduced.

In certain compressors or turbines with counterrotating rotor blades, a seal may be provided to seal-off the leakage airflow. For example, with a compressor having counterrotating rotor blades, a seal may be provided at a downstream end to seal-off the leakage airflow coming from the compressor. However, this leakage airflow may have a relatively high pressure, making it difficult to effectively seal-off and contain such leakage air. Accordingly, a turbomachine having one or more features for better handling the leakage airflow (or other high pressure airflow) from a compressor or turbine having counterrotating rotor blades would be useful.

BRIEF DESCRIPTION

Aspects and advantages of the invention will be set forth in part in the following description, or may be obvious from the description, or may be learned through practice of the invention.

In one exemplary embodiment of the present disclosure a gas turbine engine defining an axial direction, a radial direction, and a circumferential direction is provided. The gas turbine engine includes a compressor and a turbine; a plurality of rotor blades positioned in the compressor or the turbine and arranged in a plurality of stages along the axial direction; an outer drum positioned at least partially radially outward of the plurality of rotor blades and rotatable with the plurality of rotor blades; and a casing extending over the outer drum and defining a plurality of air cavities with the outer drum, the plurality of air cavities arranged in series airflow communication along the axial direction.

In certain exemplary embodiments each air cavity defines a pressure less than a pressure of an immediately upstream air cavity during operation of the gas turbine engine.

In certain exemplary embodiments the compressor and the turbine together define at least in part a core air flowpath, and wherein one or more of the air cavities of the plurality of air cavities is in airflow communication with the core air flowpath through the outer drum.

In certain exemplary embodiments the compressor and the turbine together define at least in part a core air flowpath, and wherein each air cavity of the plurality of air cavities is in airflow communication with the core air flowpath through the outer drum.

For example, in certain exemplary embodiments each air cavity of the plurality of air cavities defines a cavity pressure during operation of the gas turbine engine at an operating condition, and wherein each air cavity of the plurality of air cavities is in airflow communication with the core air flowpath at a location defining a flowpath pressure during operation of the gas turbine engine at the operating condition that is less than the maximum cavity pressure of the respective air cavity.

In certain exemplary embodiments the outer drum and the casing together form a plurality of airflow seals, wherein each airflow seal of the plurality of airflow seals is positioned between adjacent air cavities of the plurality of air cavities.

For example, in certain exemplary embodiments each airflow seal includes a plurality of labyrinth seals coupled to or formed with the outer drum and a corresponding seal land coupled to or formed with the casing.

For example, in certain exemplary embodiments each airflow seal of the plurality of airflow seals defines a pressure ratio greater than 1:1 and less than 4:1.

For example, in certain exemplary embodiments the plurality of rotor blades are positioned within the compressor, and wherein the compressor defines a compressor pressure ratio of at least about 2:1 and up to about 20:1.

For example, in certain exemplary embodiments the compressor and the turbine together define at least in part a core air flowpath, wherein each air cavity of the plurality of air cavities is in airflow communication with the core air flowpath through the outer drum, wherein each air cavity defines a first airflow leakage from the air cavity through an airflow seal of the plurality of airflow seals, wherein each air cavity further defines a second airflow leakage from the air cavity through the outer drum to the core air flowpath, wherein each cavity further defines a ratio of the first airflow leakage to the second airflow leakage between about 10:90 and 90:10 during operation of the gas turbine engine.

In certain exemplary embodiments the plurality of rotor blades is positioned within the compressor, wherein the plurality of air cavities includes an upstream-most air cavity, and wherein the upstream-most air cavity is in airflow communication with the compressor for receiving a compressor discharge pressure airflow.

For example, in certain exemplary embodiments the gas turbine engine further includes a heat exchanger in thermal communication with the upstream-most air cavity, the compressor discharge pressure airflow, or both, for reducing a temperature of an airflow within or to the upstream-most air cavity.

In certain exemplary embodiments the plurality of rotor blades are arranged in at least two stages of rotor blades along the axial direction, and wherein the plurality of air cavities includes at least two air cavities.

In certain exemplary embodiments the gas turbine engine further includes a bleed assembly in airflow communication with an air cavity of the plurality of air cavities for receiving a bleed airflow from the air cavity.

In certain exemplary embodiments the plurality rotor blades is a plurality of first speed rotor blades, and wherein the gas turbine engine further includes a plurality of second speed rotor blades, and wherein the plurality of first speed rotor blades are alternatingly spaced with the plurality of second speed rotor blades.

In certain exemplary embodiments the plurality of rotor blades define a radially outer end, and wherein the plurality of rotor blades of each stage of the plurality of stages are coupled at their respective radially outer ends.

In certain exemplary embodiments the plurality of rotor blades is positioned within the turbine, wherein the plurality of air cavities includes an upstream-most air cavity, and wherein the gas turbine engine includes a bleed air circuit in airflow communication with the upstream-most air cavity and the compressor, and wherein the bleed air circuit includes a one-way valve.

In an exemplary embodiment of the present disclosure, an airflow management assembly is provided for a gas turbine engine including a compressor, a turbine, and a plurality of rotor blades positioned in the compressor or the turbine and arranged in a plurality of stages. The gas turbine engine further defines an axial direction, a radial direction, and a circumferential direction. The airflow management assembly includes an outer drum configured to be positioned around the plurality of rotor blades and rotatable with the plurality of rotor blades; and a casing extending over the outer drum and defining a plurality of air cavities with the outer drum, the plurality of air cavities arranged in series airflow communication along the axial direction.

In certain exemplary embodiments the drum defines a plurality of openings, wherein each opening is in airflow communication with one of the plurality of air cavities.

In certain exemplary embodiments the outer drum and the casing together form a plurality of airflow seals, wherein each airflow seal of the plurality of airflow seals is positioned between adjacent air cavities of the plurality of air cavities.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
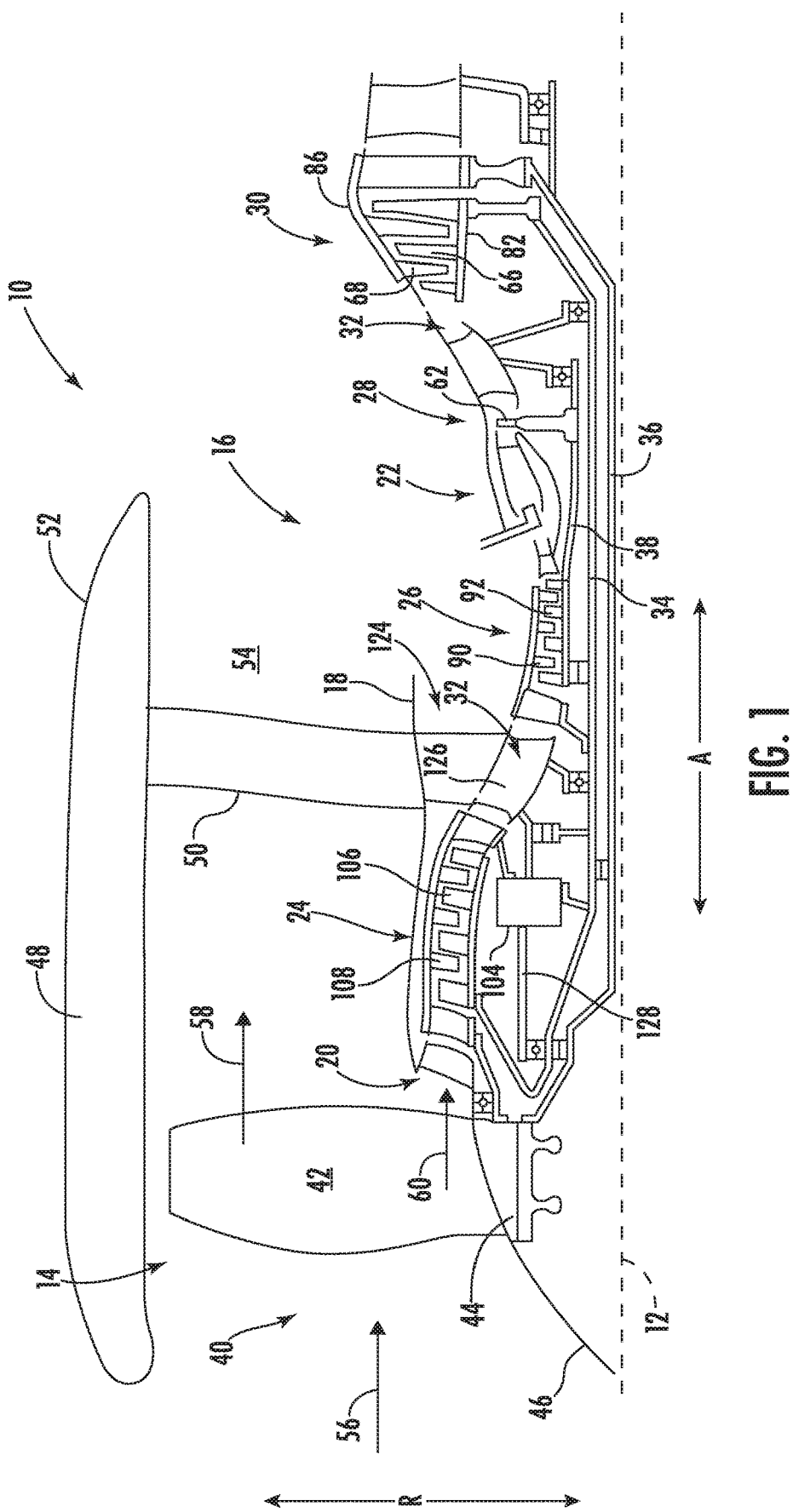
FIG. 1 is a schematic cross sectional view of an exemplary gas turbine engine incorporating exemplary aspects of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a gas turbine engine, such as a turbofan engine, having a compressor section, a combustion section, a turbine section, and an airflow management system. The airflow management system receives high pressure airflow, such as an airflow leakage from one of compressor section, combustion section, and/or the turbine section. More specifically, the gas turbine engine may further include a plurality of rotor blades positioned in a compressor of the compressor section or a turbine of the turbine section, an outer drum positioned radially outward of the plurality of rotor blades and rotatable with the plurality of rotor blades, and a casing extending over the outer drum. The casing and the outer drum may together define a plurality of air cavities arranged in series airflow communication along an axial direction of the gas turbine engine.

In certain exemplary embodiments, the casing and the outer drum may further form a plurality of air seals, with each air seal positioned between adjacent air cavities, to allow for the pressures within the plurality of air cavities to be sequentially, and gradually, reduced. In such a manner, a relatively high pressure airflow received by an upstream-most air cavity may be effectively managed by the plurality of air cavities arranged in series, and separated by the respective plurality of air seals. Such may therefore allow for a series of relatively low pressure ratio seals to effectively contain and manage a relatively high pressure airflow.

Moreover, in certain exemplary embodiments, the drum may allow for one or more of the air cavities to "leak" air from such air cavity back into the core air flowpath (e.g., the compressor or turbine). For example, the outer drum may include one or more openings in airflow communication with both an air cavity and the core air flowpath. In such a manner, an energy within the relatively high pressure air flow received by the upstream-most air cavity may be partially recuperated by the airflow management system.

Referring now to the drawings, wherein identical numerals indicate the same elements throughout the Figs., FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (i.e., a direction extending about the axial direction A; see FIG. 3). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. Although only a portion of the outer casing 18 is depicted in FIG. 1, it will generally be appreciated that the outer casing 18 encases, in serial flow relationship, a compressor section including a compressor, a combustion section 22 including a combustor, and a turbine section including a turbine. More specifically, for the embodiment shown, the compressor section includes a low pressure (LP) compressor 24 and a high pressure (HP) compressor 26, with the HP compressor 26 located downstream of the LP compressor 24; and the turbine section includes a high pressure (HP) turbine 28 and a low pressure (LP) turbine 30, with the LP turbine 30 located downstream of the HP turbine 28. The compressor section, combustion section 22, and turbine section together define a core air flowpath 32 extending from the annular inlet 20 through the LP compressor 24, HP compressor 26, combustion section 22, HP turbine 28, and LP turbine 30.

As will be explained in greater detail below, the exemplary turbofan engine 10 depicted is a three-speed turbofan engine. For example, one or more of the turbines and compressors within the turbine section and compressor section, respectively, include: rotor blades rotating at a first speed, which may generally be an intermediate-speed; rotor blades rotating at a second speed, which may generally be a low-speed; and a rotor blades rotating at a third speed, which may generally be a high-speed. As such, it will be appreciated that the exemplary turbofan engine depicted generally also includes a first spool, or intermediate-speed spool 34, a second spool, or low-speed spool 36, and a third spool, or high-speed spool 38.

It will be appreciated that as used herein, the terms "high pressure" and "low pressure" are generally relative terms, and do not refer to or require any specific pressure or pressure ratio. Similarly, it will be appreciated that as used herein, the terms "high-speed," "low-speed," and "intermediate-speed" are also generally relative terms, and do not refer to or require any specific rotational speed.

Referring still to FIG. 1, for the embodiment depicted, the fan section 14 includes a fan having a plurality of fan blades 42 coupled to a disk 44 in a spaced apart manner. As depicted, the fan blades 42 extend outwardly from the disk 44 generally along the radial direction R. The fan blades 42 and disk 44 are together rotatable about the longitudinal axis 12. As will be explained in greater detail below, for the embodiment shown, the fan blades 42 and disk 44 are together rotatable about the longitudinal axis 12 by the low-speed spool 36 and the intermediate-speed spool 34.

Additionally, the disk 44 is covered by rotatable spinner cone 46 aerodynamically contoured to promote an airflow through the plurality of fan blades 42. The exemplary fan section 14 includes an annular fan casing or outer nacelle 48 that circumferentially surrounds the fan 40 and/or at least a portion of the turbomachine 16. The nacelle 48 is supported relative to the turbomachine 16 by a plurality of circumferentially-spaced outlet guide vanes 50. Moreover, a downstream section 52 of the nacelle 48 extends over an outer portion of the turbomachine 16 so as to define a bypass airflow passage 54 therebetween.

During operation of the turbofan engine 10, a volume of air 56 enters the turbofan 10 through an associated inlet of the nacelle 48 and/or fan section 14. As the volume of air 56 passes across the fan blades 42, a first portion of the air 56 as indicated by arrows 58 is directed or routed into the bypass airflow passage 54 and a second portion of the air 56 as indicated by arrow 60 is directed or routed into turbomachine 16. The ratio between the first portion of air 58 and the second portion of air 60 is commonly known as a bypass ratio. The pressure of the second portion of air 60 is then increased as it is routed through the LP compressor 24 and HP compressor 26 and into the combustion section 22, where it is mixed with fuel and burned to provide combustion gases through the turbine section. Operation of the compressor section will be discussed in greater detail below, with reference to, e.g., FIG. 4.

Figure 2:
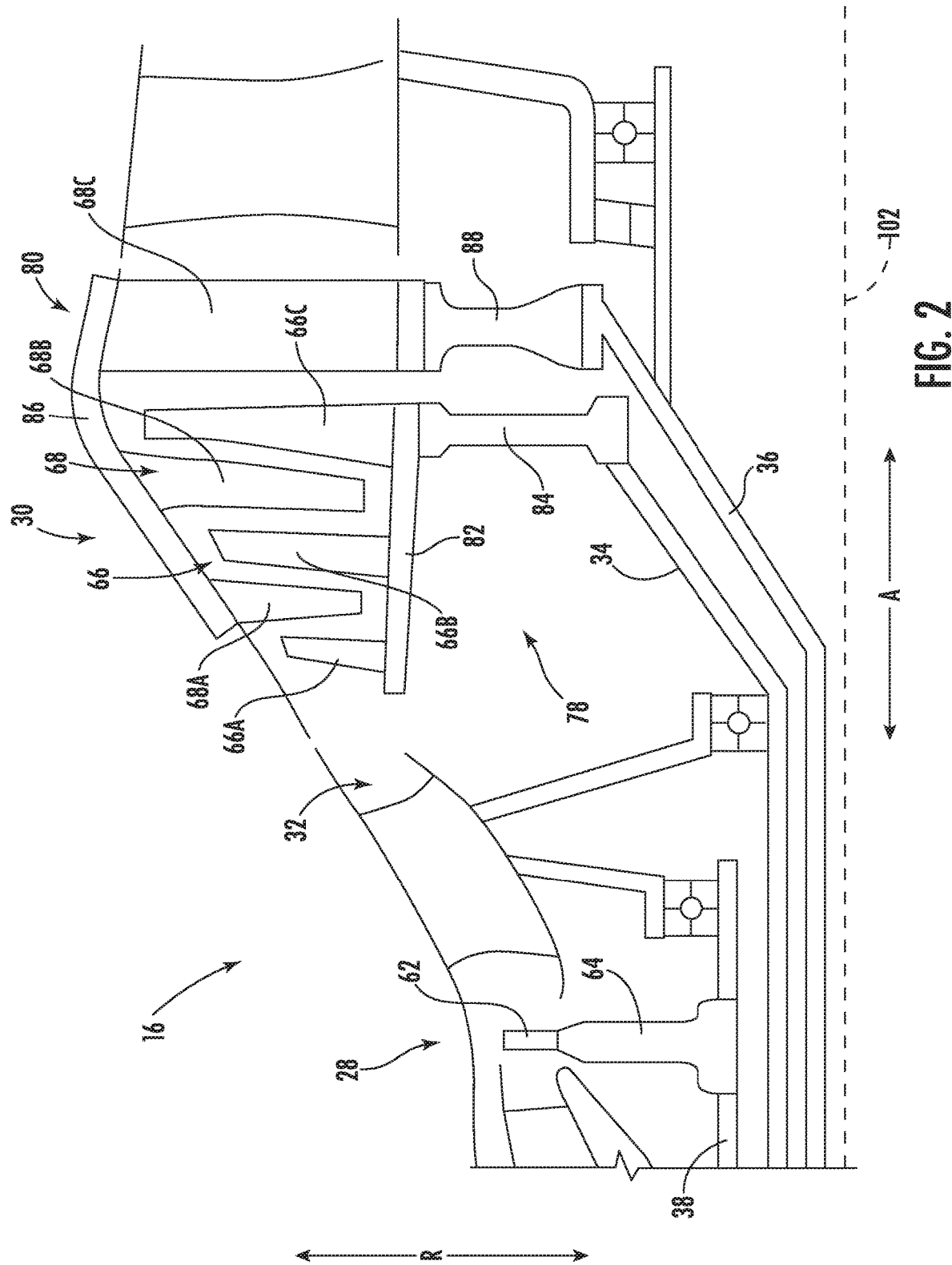
FIG. 2 is a close-up, schematic, cross sectional view of a turbine section of the exemplary gas turbine engine of FIG. 1.

Referring still to FIG. 1, and now also to FIG. 2, providing a close-up view of the turbine section of the exemplary turbofan engine 10 of FIG. 1, the HP turbine 28 includes a plurality of high-speed HP turbine rotor blades 62. More specifically, for the embodiment shown, the HP turbine 28 is a single stage turbine, including a single stage of high-speed HP turbine rotor blades 62. Each of the plurality of high-speed HP turbine rotor blades 62 are coupled to a rotor disk 64, which in turn is coupled to the high-speed spool 38. In such a manner, it will be appreciated that the plurality of high-speed HP turbine rotor blades 62 may extract energy from combustion gases from the combustion section 22 during operation and transfer such energy to the high-speed spool 38, such that the high-speed spool 38 is rotatable by the high-speed HP turbine rotor blades 62 of the HP turbine 28 and may drive operations within the compressor section, as is discussed below.

The combustion gases are then routed through the LP turbine 30 where a second portion of thermal and kinetic energy is extracted from the combustion gases via sequential stages of LP turbine rotor blades. Notably, for the embodiment shown, the LP turbine 30 includes a plurality of first speed LP turbine rotor blades and a plurality of second speed LP turbine rotor blades. The plurality of first speed turbine rotor blades of the LP turbine is configured to rotate in an opposite circumferential direction than the plurality of second speed LP turbine rotor blades. More specifically, for the embodiment shown the plurality of first speed LP turbine rotor blades is a plurality of intermediate-speed LP turbine rotor blades 66, and the plurality of second speed LP turbine rotor blades is a plurality of low-speed LP turbine rotor blades 68. As such, the plurality of intermediate-speed LP turbine rotor blades 66 may be coupled to the intermediate-speed spool 34, such that the intermediate-speed spool 34 is rotatable by the plurality of intermediate-speed LP turbine rotor blades 66. Similarly, the plurality of low-speed LP turbine rotor blades 68 is coupled to the low-speed spool 36, such that the low-speed spool 36 is rotatable by the plurality of low-speed LP turbine rotor blades 68.

Figure 3:
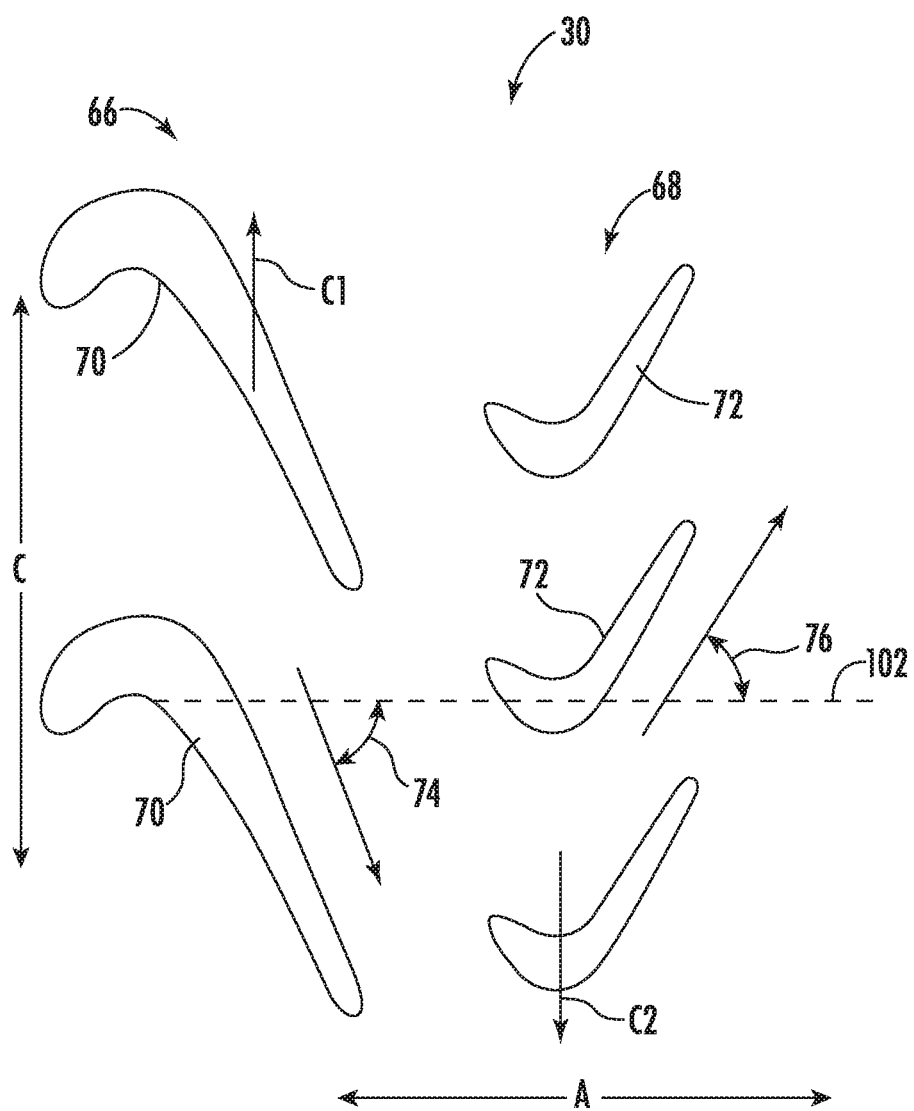
FIG. 3 is a cross sectional view depicting exemplary blade pitch angles of a turbine of a turbine section in accordance with an exemplary embodiment of the present disclosure.

More specifically, referring briefly to FIG. 3, an orientation of the plurality of intermediate-speed LP turbine rotor blades 66 and low-speed LP turbine rotor blades 68 is generally provided. More specifically, still, the embodiment of FIG. 3 generally depicts a first stage of the plurality of intermediate-speed LP turbine rotor blades 66 and a first stage of the plurality of low-speed LP turbine rotor blades 68. In the embodiment shown, the intermediate-speed LP turbine rotor blades 66 are configured to rotate in a first circumferential direction C1, while the low-speed LP turbine rotor blades 68 are configured to rotate in a second circumferential direction C2. It should be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

Referring still to FIG. 3, it will further be appreciated that for the embodiment depicted, each turbine rotor blade of the intermediate-speed LP turbine rotor blades 66 includes an airfoil 70, and similarly, each turbine rotor blade of the low-speed LP turbine rotor blades 68 includes an airfoil 72. The airfoils 70 each define an exit angle 74, and similarly the airfoils 72 each define an exit angle 76. The exit angles 74, 76 of the airfoils 70, 72, respectively, as well as the pressure and suction sides (not labeled) of such airfoils 70, 72, respectively, and other features of the turbofan engine 10, may cause the intermediate-speed LP turbine rotor blades 66 and the low-speed LP turbine rotor blades 68 to rotate in the first and second circumferential directions C1, C2, respectively. It will be appreciated, however, that in other embodiments, the airfoils 70, 72 may have any other suitable configuration.

Referring now back to FIGS. 1 and 2, it will further be appreciated that the plurality of intermediate-speed LP turbine rotor blades 66 and the plurality of low-speed LP turbine rotor blades 68 are alternatingly spaced along the axial direction A of the turbofan engine 10. As used herein, the term "alternatingly spaced along the axial direction A" refers to the plurality of intermediate-speed LP turbine rotor blades 66 including at least one turbine rotor blade positioned along the axial direction A between two axially spaced turbine rotor blades of the plurality of low-speed LP turbine rotor blades 68. For example, for the embodiment depicted, the plurality of intermediate-speed LP turbine rotor blades 66 includes three sequential stages of intermediate-speed LP turbine rotor blades 66, and similarly, the plurality of low-speed LP turbine rotor blades 68 includes three sequential stages of low-speed LP turbine rotor blades 68. A first stage of intermediate-speed LP turbine rotor blades 66A is positioned forward of the plurality of low-speed LP turbine rotor blades 68, a second stage of intermediate-speed LP turbine rotor blades 66B is positioned between a first stage of low-speed LP turbine rotor blades 68A and a second stage of low-speed LP turbine rotor blades 68B along the axial direction A, and a third stage of intermediate-speed LP turbine rotor blades 66C is positioned between the second stage of low-speed LP turbine rotor blades 68B and a third stage of low-speed LP turbine rotor blades 68C along the axial direction A. It will be appreciated, however, that in other exemplary embodiments, the intermediate-speed LP turbine rotor blades 66 and low-speed LP turbine rotor blades 68 may be arranged in any other suitable, alternatingly spaced manner and including any suitable number of stages of turbine rotor blades.

Furthermore, for the embodiment shown, each of the plurality of stages of intermediate-speed LP turbine rotor blades 66 are coupled to a first LP turbine connection assembly 78 and each of the plurality of stages of low-speed LP turbine rotor blades 68 are coupled to a second LP turbine connection assembly 80. Each of the plurality of intermediate-speed LP turbine rotor blades 66 are coupled to the first LP turbine connection assembly 78 at their respective radially inner ends, and similarly, each of the plurality of low-speed LP turbine rotor blades 68 are coupled to the second LP turbine connection assembly 80 at their respective radially outer ends. More specifically, for the embodiment shown the first LP turbine connection assembly 78 includes an inner drum 82 and at least one rotor disk 84, with each of the plurality of intermediate-speed rotor blades of the LP turbine 30 coupled at a respective radially inner ends to the inner drum 82 and the inner drum coupled to the at least one rotor disk 84. Similarly, the second LP turbine connection assembly 80 includes an outer drum 86 and at least one rotor disk 88, with each of the plurality of low-speed LP turbine rotor blades 68 coupled at their respective radially outer ends to the outer drum 86 and the outer drum 86 couple to the at least one rotor disk 88 (through the third stage of third stage of low-speed LP turbine rotor blades 68C for the embodiment shown).

It will be appreciated, however, that the mounting/coupling configuration of the LP turbine 30 is provided by way of example only. In other exemplary embodiments, the first LP turbine connection assembly 78 and/or second LP turbine connection assembly 80 may have any other suitable configuration. For example, in other embodiments, one or both of the first LP turbine connection assembly 78 and second LP turbine connection assembly 80 may include any other suitable number of rotor discs, blisks, drums, etc., and may be coupled to the adjacent stages at their respective inner ends or outer ends.

Figure 4:
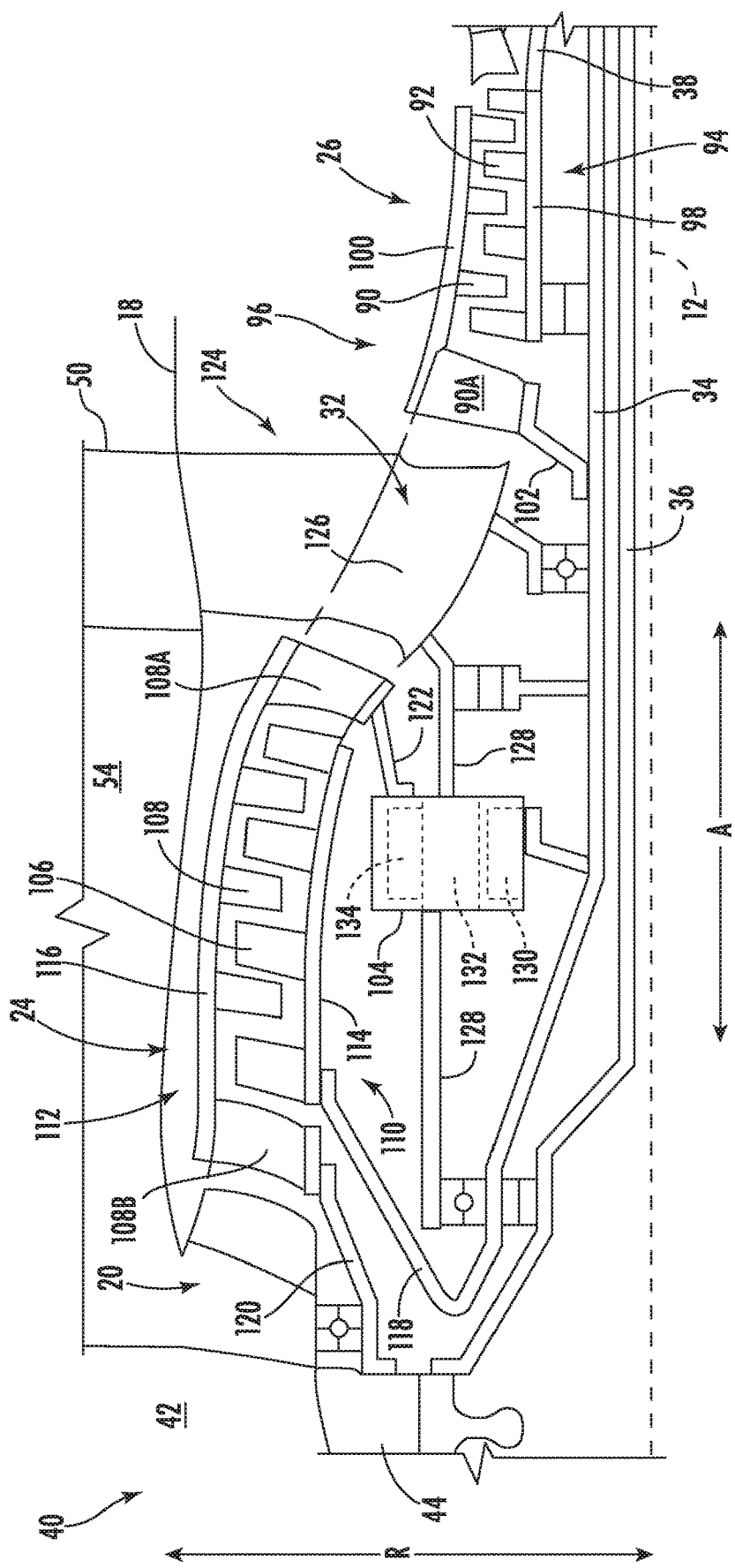
FIG. 4 is a close-up, schematic, cross sectional view of a compressor section of the exemplary gas turbine engine of FIG. 1.

Referring now still to FIG. 1 and now also to FIG. 4, operation of the compressor section and fan section 14 of the exemplary turbofan engine 10 will be described in greater detail.

As noted, the compressor section includes the LP compressor 24 and the HP compressor 26. In addition, the turbomachine 16 includes a gearbox 104. Referring first specifically to the LP compressor 24, the LP compressor 24 generally includes a plurality of first speed LP compressor rotor blades and a plurality of second speed LP compressor rotor blades. The plurality of first speed LP compressor rotor blades is, for the embodiment shown, a plurality of intermediate-speed LP compressor rotor blades 106, and the plurality of second speed LP compressor rotor blades is, for the embodiment shown a plurality of low-speed LP compressor rotor blades 108. The intermediate-speed spool 34 is coupled to the plurality of intermediate-speed LP compressor rotor blades 106 for driving the plurality of intermediate-speed LP compressor rotor blades 106 in a first direction. The intermediate-speed spool 34 is further coupled to the plurality of low-speed LP compressor rotor blades 108 across the gearbox 104 for driving the plurality of low-speed LP compressor rotor blades 108 in a second direction, the second direction being opposite the first direction. In such a manner, the LP compressor 24 may also be referred to as a counterrotating LP compressor, e.g., with the plurality of intermediate-speed LP compressor rotor blades 106 and plurality of low-speed LP compressor rotor blades 108 configured in a similar manner as the intermediate-speed and low-speed LP turbine rotor blades 66, 68 depicted in FIG. 3. For example, the first direction may be the same as the first circumferential direction C1 discussed above with reference to FIG. 3, and similarly, the second direction may be the same as the second circumferential direction C2 discussed above with reference to FIG. 3.

As with the counterrotating LP turbine 30, the plurality of intermediate-speed LP compressor rotor blades 106 and low-speed LP compressor rotor blades 108 are alternatingly spaced along the axial direction A. Additionally, for the embodiment shown, the LP compressor 24 includes a first LP compressor connection assembly 110 for coupling each of the plurality of intermediate-speed LP compressor rotor blades 106 and a second LP compressor connection assembly 112 for coupling each of the plurality of low-speed LP compressor rotor blades 108. The first LP compressor connection assembly 110 generally includes an inner drum 114, with each of the plurality of intermediate-speed LP compressor rotor blades 106 coupled to the inner drum 114 at their respective radially inner ends, and similarly, the second LP compressor connection assembly 112 generally includes an outer drum 116, with each of the plurality of low-speed LP compressor rotor blades 108 coupled to the outer drum 116 at their respective radially outer ends.

More specifically, the first LP compressor connection assembly 110 further includes an intermediate-speed connection member 118 extending between the inner drum 82 and the intermediate-speed spool 34 and the second LP compressor connection assembly 112 further includes a forward low-speed connection member 120 and an aft low-speed connection member 122. Moreover, it will be appreciated that the turbofan engine 10 further includes a frame assembly 124, with the frame assembly 124 including a strut 126 (or rather a plurality of struts 126 spaced along the circumferential direction) extending through the core air flowpath 32 at a location downstream of the LP compressor 24 and upstream of the HP compressor 26. The frame assembly 124 further includes a frame member 128 coupled to the strut 126 and extending forward. The frame member 128, for the embodiment shown, and as will be discussed in greater detail below, extends through the gearbox 104 and is configured for mounting the gearbox 104 to the frame assembly 124. The intermediate-speed connection member 118 of the first LP compressor connection assembly 110 extends from the intermediate-speed spool 34 forward and around the frame member 128 to connect inner drum 114 (and the plurality of intermediate-speed LP compressor rotor blades 108) to the intermediate-speed spool 34.

The gearbox 104 generally includes a first gear, a second gear, and a third gear. More specifically, the gearbox 104 is generally configured as a planetary gear box, such that the first gear is a sun gear 130, the second gear is a planet gear 132 (or rather, a plurality of planet gears 132) and the third gear is a ring gear 134. As noted above, the plurality of low-speed LP compressor rotor blades 108 are driven by the intermediate-speed spool 34 across the gearbox 104. More specifically, the intermediate-speed spool 34 directly rotates the sun gear 130, and the aft low-speed connection member 122 couples the plurality of low-speed LP compressor rotor blades 108 to the ring gear 134, such that the ring gear 134 directly rotates the plurality of low-speed LP compressor rotor blades 108. The planet gear 132, or rather, the plurality of planet gears 132, are maintained stationary along the circumferential direction C through the mounting to the frame member 128. (Although not depicted, it will be appreciated that the frame member 128 may define a plurality of slots within which the planet gears 132 are positioned to allow the frame member 128 to extend through the gearbox 104.) In such a manner, it will be appreciated that the gearbox 104 facilitates a rotation of the low-speed LP compressor rotor blades 108 by the intermediate-speed spool 34, while reducing a rotational speed of the low-speed LP compressor rotor blades 108 relative to the intermediate-speed spool 34, and further reversing a rotational direction of the LP compressor 24 rotor blades relative to the intermediate-speed spool 34.

Further, it will be appreciated that for the embodiment shown the fan 40 of the fan section 14 is configured to be driven by both the low-speed spool 36 and the intermediate-speed spool 34, such that a driving power for the fan 40 is shared between these two spools 34, 36. More specifically, the low-speed spool 36, which is rotatable by the plurality of low-speed LP turbine rotor blades 68, is coupled to the fan 40 directly for driving the fan 40 at the same rotational speed and in the same rotational direction (e.g., without any gear reduction). Further, the plurality of low-speed LP compressor rotor blades 108 are also coupled to the fan 40 for adding power to the fan 40, such that the intermediate-speed spool 34 is also configured for driving the fan 40. However, the intermediate-speed spool 34 is coupled to the fan 40 across the gearbox 104 and the plurality of low-speed LP compressor rotor blades 108. More specifically, for the embodiment depicted, the intermediate-speed spool 34 is coupled to an aftmost stage of the low-speed LP compressor rotor blades 108A (across the sun gear, planet gears 132, and ring gear 134 of the gearbox 104 and the aft low-speed connection member 122), which is coupled to the outer drum 116, which is coupled to the forward low-speed connection member 120 (across a forwardmost stage of low-speed LP compressor rotor blades 108B), which is coupled to the fan 40.

In such a manner, it will be appreciated that the fan 40 is driven by both the intermediate-speed spool 34 and the low-speed spool 36 during operation. In such a manner, it will be appreciated that the gearbox 104 may not need to transfer all the power required for driving the fan 40 (as compared to traditional geared gas turbine engines). Such may result in less wear and tear on the gearbox 104, which may accordingly allow for a smaller, lighter, more compact, and less expensive gearbox 104. Further, utilizing an alternatingly spaced LP compressor 24 and/or an alternatingly spaced HP compressor 26 may allow for a much more efficient compressor section of the gas turbine engine, which may allow for a higher overall compressor ratio and/or a more compact compressor section. As such, the gas turbine engine may generally operate more efficiently.

Further, still, as the low speed spool 36 is providing a portion of the driving power for the fan 40 direction, and not through a gearbox, a portion of a forward thrust on the low speed spool 36 by the fan 40 may be offset by opposing axial forces on the low speed spool 36 by the LP turbine 30. Such may therefore allow for a lesser number of thrust bearings, or smaller thrust bearings, to be utilized to support the fan 40.

Figure 5:
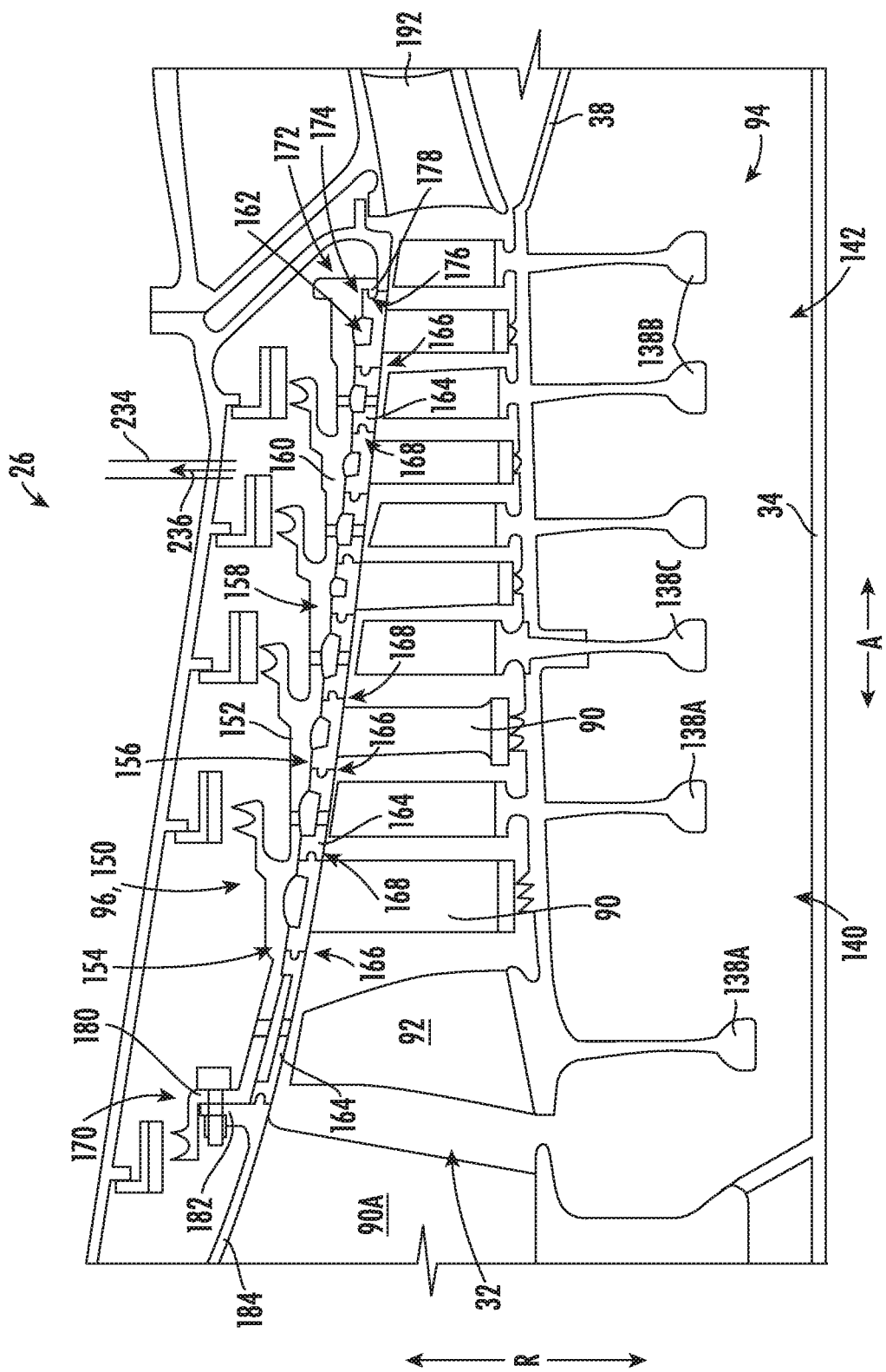
FIG. 5 is a close-up, schematic, cross sectional view of a high pressure compressor of the compressor section of the exemplary gas turbine engine of FIG. 1.

Referring now also to FIG. 5, aspects of the HP compressor 26 will be described. As shown, the HP compressor 26 includes a plurality of first speed HP compressor rotor blades and a plurality of third speed HP compressor rotor blades. For the embodiment shown, the plurality of first speed HP compressor rotor blades is a plurality of intermediate-speed HP compressor rotor blades 90 and the plurality of third speed HP compressor rotor blades is a plurality of high-speed HP compressor rotor blades 92. The plurality of intermediate-speed HP compressor rotor blades 90 are arranged in a plurality of stages along the axial direction A, and the plurality of high-speed HP compressor rotor blades 92 are similarly arranged in a plurality of stages along the axial direction A. For the embodiment shown, the plurality of intermediate-speed HP compressor rotor blades 90 are arranged in at least five stages along the axial direction A, and more specifically are arranged in six stages along the axial direction A (but may include up to, e.g., twenty stages or more). Similarly, for the embodiment shown, the plurality of high-speed HP compressor rotor blades 92 are arranged in the same number of stages as the intermediate-speed HP compressor rotor blades 90. However, in other embodiments, one or both of the intermediate-speed or high-speed HP compressor rotor blades 90, 92 may be arranged in any other suitable number of stages.

Further, the high-speed spool 38 is coupled to the plurality of high-speed HP compressor rotor blades 92 for driving/rotating the plurality of high-speed HP compressor rotor blades 92. Similarly, the intermediate-speed spool 34 is coupled to the plurality of intermediate-speed HP compressor rotor blades 90 for driving/rotating the plurality of intermediate-speed HP compressor rotor blades 90.

Similar to the LP compressor 24 and LP turbine 30, the plurality of high-speed HP compressor rotor blades 92 and the plurality of intermediate-speed HP compressor rotor blades 90 are alternatingly spaced along the axial direction A of the turbofan engine 10 and are configured to counter-rotate. For example, the plurality of high-speed HP compressor rotor blades 92 and the plurality of intermediate-speed HP compressor rotor blades 90 may be configured in a similar manner as the intermediate-speed and low-speed LP turbine rotor blades 66, 68 depicted in FIG. 3.

Further, for the embodiment shown, the HP compressor 26 includes a first HP compressor connection assembly 94 for coupling each of the plurality of high-speed HP compressor rotor blades 92 and a second HP compressor connection assembly 96 for coupling each of the plurality of intermediate-speed HP compressor rotor blades 90 of the HP compressor 26. The first HP compressor connection assembly 94 generally includes an inner drum 98, with each of the plurality of high-speed HP compressor rotor blades 92 coupled to the inner drum 98 at their respective radially inner ends. More specifically, as is depicted in FIG. 5, the inner drum 98 is actually a plurality of rotor disks 138, and more specifically still, the inner drum 98 is formed of a forward section 140 of rotor disks 138A and an aft section 142 of rotor disks 138B, each coupled together at an intermediate rotor disk 138C.

As is also depicted in FIG. 5, the second HP compressor connection assembly 96 is integrated with the plurality of intermediate speed HP compressor rotor blades 90. For example, referring particularly to FIG. 5, the turbofan engine 10 includes a rotor blade assembly having a plurality of stage assemblies. More specifically, the turbofan engine 10 includes an intermediate speed HP compressor rotor blade assembly ("ISHP compressor rotor blade assembly") 150 positioned within the HP compressor 26 having a plurality of intermediate speed HP compressor stage assemblies ("ISHP stage assemblies"). The turbofan engine 10 further includes a rotating drum member, or simply a "drum member," 152 positioned radially outward of the plurality of intermediate-speed HP compressor rotor blades 90, and more specifically, outward of the plurality of ISHP stage assemblies along the radial direction R. The drum member 152 is rotatable with the plurality of ISHP stage assemblies (and intermediate-speed HP compressor rotor blades 90) and, as will be explained further below, clamps the ISHP stage assemblies against one another and constraining them along the radial direction R.

For example, as noted above, the intermediate speed HP compressor rotor blades 90 are arranged in six stages along the axial direction A. More specifically, the intermediate speed HP compressor rotor blades 90 are arranged in a forward-most stage of intermediate speed HP compressor blades 90A, and the ISHP compressor rotor blade assembly 150 includes five ISHP stage assemblies—a first ISHP stage assembly 154, a second ISHP stage assembly 156, a third ISHP stage assembly 158, a fourth ISHP stage assembly 160, and a fifth ISHP stage assembly 162. For the embodiment depicted, each ISHP stage assembly 154-162 includes a circumferential ring member 164 and a plurality intermediate speed HP compressor rotor blades 90. The plurality intermediate speed HP compressor rotor blades 90 may be grouped into a plurality of circumferentially arranged segments of ISHP rotor blades 90 to allow for installation.

For example, in at least certain exemplary aspects, the forward-most stage of intermediate speed HP compressor rotor blades 90A may be installed first, then the plurality of high speed HP compressor rotor blades 92 (and each of the rotor disks 138, etc.) may be installed, and then each of the ISHP stage assemblies 154-162 be installed sequentially thereafter, with the plurality intermediate speed HP compressor rotor blades 90 of each stage assembly 154-162 being installed between adjacent stages of assembled high speed HP compressor rotor blades 92. For example, subsequent to installation of the forward-most stage of intermediate speed HP compressor rotor blades 90A and high speed HP compressor rotor blades 92, the ring member 164 of the first ISHP stage assembly 154 may be installed, followed by the intermediate speed HP compressor rotor blades 90 of the first ISHP stage assembly 154 (which, again, may be separated into a plurality of segments to allow them to be installed between adjacent stages of high speed HP compressor rotor blades 92). The remaining ISHP stage assemblies may be sequentially installed thereafter in a similar manner.

For the embodiment depicted, the ring member 164 and plurality of ISHP compressor rotor blades 90 of each ISHP stage assembly 154-162 are fitted together at an attachment interface 166, which for the embodiment shown, is a tongue and groove attachment interface. Similarly, each adjacent ISHP stage assembly is fitted to an adjacent ISHP stage assembly at an attachment interface 168, which is also configured as a tongue and groove attachment interface for the embodiment shown.

Once each of the ISHP stage assemblies 154-162 are installed, the outer drum 152 may be slid generally along the axial direction A over the plurality of ISHP stage assemblies 154-162 to fix the plurality of ISHP stage assemblies 154-162 in position and to the forward-most stage of intermediate speed HP compressor rotor blades 90A. In such a manner, it will be appreciated that the outer drum 152 depicted generally defines an annular shape.

More specifically, for the embodiment shown, the outer drum 152 extends between a first end 170 and a second end 172 generally along the axial direction A. Additionally, the downstream-most ISHP stage assembly, which for the embodiment depicted is the fifth ISHP stage assembly 162, includes a downstream end 174 defining a circumferential groove 176. The outer drum 152 includes a hook 178 at the second end 172 received within the circumferential groove 176 when the outer drum 152 is installed. Further, the outer drum 152 includes a flange 180 at the first end 170 coupled to a corresponding flange 182 of the forward-most stage of intermediate speed HP compressor rotor blades 90A (or rather of an outer platform 184 of the forward-most stage of intermediate speed HP compressor rotor blades 90A).

As such, the outer drum 152 may press each of the ISHP stage assemblies against one another, such that the various attachment interfaces 166, 168, which are generally friction-fit interfaces, fix the various components in position. Additionally, the outer drum 152 may contact an outer surface of the ISHP stage assemblies 154-162 to constrain the ISHP stage assemblies 154-162 along the radial direction R.

The exemplary ISHP compressor rotor blade assembly 150 depicted in FIG. 5 and described above generally allows for the installation of a plurality of rotor blades of a counterrotating compressor or turbine subsequent to full assembly (or partial assembly in certain situations) of the other speed rotor blades of the counterrotating compressor or turbine. Moreover, in at least certain exemplary embodiments of the present disclosure, the exemplary ISHP compressor rotor blade assembly 150 may be assembled such that there are no flanges or other similar members coupling, e.g., a top half and a bottom half, resulting in a substantially completely symmetrical compressor or turbine rotor blade assembly capable of being installed within an already installed set of stages of rotor blades. The symmetrical configuration may result in a more desired operation of the compressor or turbine, more capable of accommodating, e.g., thermal expansion during operation.

It will be appreciated, however, that in other exemplary embodiments, any other suitable ISHP compressor rotor blade assembly 150 may be provided, and more specifically, any other suitable configuration of intermediate-speed HP compressor rotor blades 90 may be provided. For example, any other suitable attachment method may be utilized to assembly the intermediate-speed HP compressor rotor blades 90. For example, instead of utilizing friction fit attachment interfaces, one or more of the various ISHP stage assemblies 154-162 depicted may utilize bolted connections. Further, although for the embodiment shown the outer drum 152 is configured as a separate component than the ISHP stage assemblies, in other embodiments, the outer drum 152 may be integrated into the ISHP stage assemblies. For example, the outer drum 152 may be formed of a plurality of outer platforms, ring members, etc. coupled together in any suitable manner.

Further, it will be appreciated that the exemplary turbofan engine 10 described above with reference to FIGS. 1 through 5 is provided by way of example only. In other exemplary embodiments, any other gas turbine engine configuration may be provided. For example, in certain exemplary embodiments, one or more of the LP compressor 24, HP turbine 28, or LP turbine 30 may include a mounting configuration similar to the ISHP compressor rotor blade assembly 150 described above with reference to FIG. 5, or alternatively, may utilize any other suitable mounting configuration. Additionally, or alternatively, although the LP compressor 24, HP compressor 26 and LP turbine 30 are depicted as including counterrotating, different speed rotor blades, in other embodiments, other suitable compressors and/or turbines may be provided (e.g., the LP or HP compressor 24, 26 may be setup as a separate intermediate pressure compressor and low or high pressure compressor; similarly the LP turbine 30 may be setup as a separate intermediate pressure turbine and low pressure turbine). Similarly, although the HP turbine 28 is depicted as a single stage HP turbine 28, in other embodiments, the HP turbine 28 may include any other suitable number of stages, may also be a counterrotating HP turbine 28, etc. Further, still, in other embodiments, the turbofan engine 10 may include any other suitable number or arrangement of compressors, turbines, etc.

It will further be appreciated that although the turbofan engine 10 is depicted as a ducted turbofan engine 10, in other exemplary embodiments, aspects the present disclosure may be incorporated into any other suitable turbomachine 16 and gas turbine engine, such as an un-ducted turbofan engine 10, a turboprop engine, a turbojet engine, a turboshaft engine, etc. Further, still, although depicted as an aeronautical gas turbine engine, in other exemplary embodiments, aspects of the present disclosure may be incorporated into any other suitable gas turbine engine, such as an aeroderivative gas turbine engine (e.g., a nautical gas turbine engine), an industrial gas turbine engine, etc.

Moreover, it will be appreciated that in still other exemplary embodiments of the present disclosure, the turbofan engine 10 may not include each of the features described herein, and/or alternatively, may include additional features not described herein.

Figure 6:
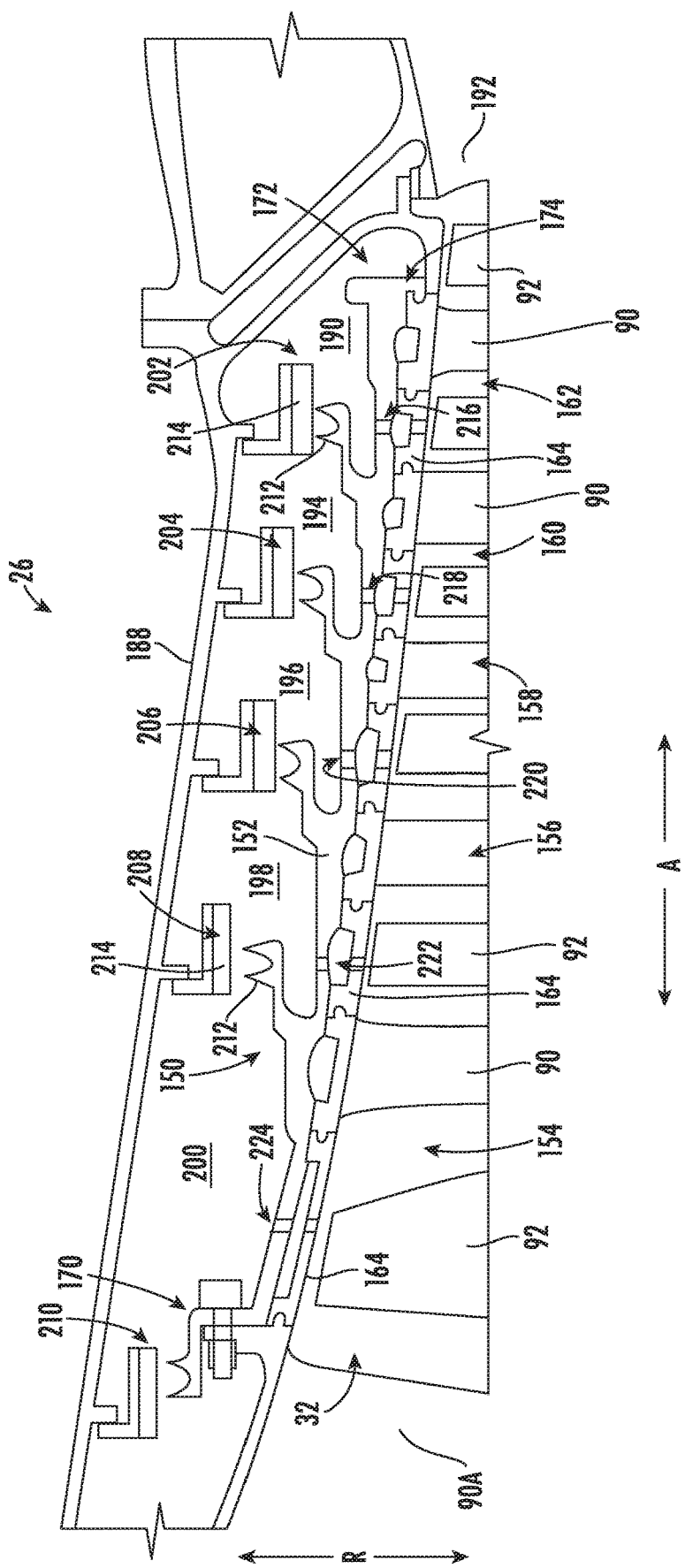
FIG. 6 is another close-up, schematic, cross sectional view of the high pressure compressor of FIG. 5.

Referring now to FIG. 6, providing a close-up view of a radially outer section of the HP compressor 26 described above with reference to FIG. 5, it will further be appreciated that the turbofan engine 10 includes a casing 188 extending over the outer drum 152, the casing 188 being stationary relative to the outer drum 152. The casing 188 defines a plurality of air cavities with the outer drum 152, the plurality of air cavities arranged in series along a length of the HP compressor 26 along the axial direction A, and radially outward of the intermediate speed and high speed rotor blades 90, 92. As will be appreciated from the description below, the outer drum 152, casing 188, and the plurality of air cavities defined therebetween may generally be referred to as an airflow management assembly for the HP compressor 26.

For example, for the embodiment shown, the plurality of air cavities includes an upstream-most air cavity, or first air cavity 190, and a plurality of downstream air cavities. The first air cavity 190 is in airflow communication with the HP compressor 26 for receiving a compressor discharge pressure air flow (see, e.g., numeral 232 in FIG. 7, discussed below). For example, in the embodiment shown, it will further be appreciated that the turbofan engine 10 includes a diffuser 192 (see also FIG. 5) located downstream of the HP compressor 26. The compressor discharge pressure air flow may be received through an interface between the fifth ISHP stage assembly 162 and an aft most stage of high-speed HP compressor rotor blades 92, through an interface between the aft most stage of high-speed HP compressor rotor blades 92 and the diffuser 192, or both. In other embodiments, however, the compressor discharge pressure air flow may additionally or alternatively be received from any other suitable interface or location of or from the HP compressor 26.

Referring still to FIG. 6, the plurality of downstream air cavities may receive airflow from the first air cavity 190. Briefly, for the embodiment shown, it will be appreciated that the plurality of air cavities includes at least two air cavities and up to, e.g., 20 air cavities. More specifically, however, for the embodiment depicted, the casing 188 and drum 152 define at least three air cavities, and more specifically still, define five air cavities. Accordingly, for the embodiment shown, in addition to the first air cavity 190, the plurality of air cavities includes a second air cavity 194 immediately downstream the first air cavity 190, a third air cavity 196 immediately downstream of the second air cavity 194, a fourth air cavity 198 immediately downstream of the third air cavity 196, and a fifth air cavity 200 immediately downstream of the fourth air cavity 198.

Moreover, for the embodiment shown it will be appreciated that each air cavity of the plurality of air cavities 190, 194, 196, 198 defines a pressure (i.e., an internal pressure) less than a pressure of an immediately upstream air cavity of the plurality of air cavities 190, 194, 196, 198 during operation of the turbofan engine 10. Accordingly, during operation of the turbofan engine 10, a pressure within the first air cavity 190 is greater than a pressure within the second air cavity 194, the pressure within the second air cavity 194 is greater than a pressure within the third air cavity 196, the pressure within the third air cavity 196 is greater than a pressure within the fourth air cavity 198, and the pressure within the fourth air cavity 198 is greater than a pressure within the fifth air cavity 200.

Such a configuration is facilitated at least in part through a plurality of seals. More specifically, the exemplary outer drum 152 and casing 188 depicted together form a plurality of airflow seals, with each airflow seal of the plurality of airflow seals being positioned between adjacent air cavities of the plurality of air cavities 190, 194, 196, 198. For example, for the embodiment depicted the plurality of airflow seals includes a first airflow seal 202 positioned between the first and second air cavities 190, 192, a second airflow seal 204 positioned between the second and third air cavities 194, 196, a third airflow seal 206 positioned between the third and fourth air cavities 196, 198, and a fourth airflow seal 208 positioned between the fourth and fifth air cavities 198, 200. Notable, the turbofan engine 10, and more specifically, the outer drum 152 and casing 188 further form a fifth airflow seal 210 positioned at a downstream end of the fifth air cavity 200. Each of the plurality of airflow seals 202-208 includes a plurality of labyrinth seals 212 coupled to or formed integrally with the outer drum 152 and a corresponding seal land 214 coupled to or formed with the casing 188. Notably, however, in other embodiments, the labyrinth seals 212 and seal lands 214 may be inverse, or any other suitable rotating-to-stationary seal arrangement may be provided.

Moreover, each of the plurality of airflow seals 202-208 defines a pressure ratio during operation of the turbine turbofan engine 10 to facilitate a sequential stepping down of the internal pressures within the series of air cavities 190, 194, 196, 198. Further, it will be appreciated that the HP compressor 26 may define a compressor pressure ratio of at least about 2:1 and up to about 20:1. In such a manner, a pressure of the compressor discharge pressure air received by the first air cavity 190 may be relatively high. With the configuration of sequential air cavities and airflow seals, the relatively high pressure may be maintained in a relatively efficient manner and without the need for a seal capable of maintaining a pressure ratio of, e.g., 10:1 or higher.

Accordingly, for example, for the embodiment depicted, each airflow seal of the plurality of airflow seals 202-208 defines a pressure ratio (i.e., a ratio of an upstream pressure to a downstream pressure) greater than 1:1 and less than about 4:1. For example, in at least certain exemplary embodiments, each of the plurality of airflow seals 202-208 may define a pressure ratio less than about 3:1, such as less than about 2:1, such as less than about 1.5:1.

Moreover, the exemplary turbofan engine 10 is configured to recoup at least some of the energy within the compressor discharge pressure airflow received by the first air cavity 190. More specifically, one or more of the air cavities of the plurality of air cavities 190, 194, 196, 198 is in airflow communication with the core air flowpath 32 through the outer drum 152. More specifically, still, for the embodiment shown each air cavity of the plurality of air cavities 190, 194, 196, 198 is in airflow communication with the core air flowpath 32 through the outer drum 152. For example, for the embodiment depicted, the outer drum 152 includes a plurality of openings extending therethrough, with the plurality of openings including a first opening 216 in airflow communication with the first air cavity 190 and the core air flowpath 32, a second opening 218 in airflow communication with the second air cavity 194 and the core air flowpath 32, a third opening 220 in airflow communication with the third air cavity 196 and the core air flowpath 32, a fourth opening 222 in airflow communication with the fourth air cavity 198 and the core air flowpath 32, and a fifth opening 224 in airflow communication with the fifth air cavity 200 and the core air flowpath 32. Notably, although a single opening is depicted extending through the outer drum 152 and in airflow communication with a respective air cavity and core air flowpath 32, each of the openings 216, 218, 220, 222, 224 may instead be a plurality of openings spaced along, e.g., the axial direction A within the respective air cavity, spaced along the circumferential direction C within the respective air cavity, or both. Moreover, for the embodiment shown, each of the openings 216, 218, 220, 222, 224 further extend through a respective ring member 164 located radially inward of the outer drum 152.

Further, it will be appreciated that the plurality of airflow seals 202-208 are configured to ensure a pressure within each of the respective air cavities 190, 194, 196, 198 is sufficiently high to allow for airflow within the air cavities 190, 194, 196, 198 to flow through the respective openings in the outer drum 152 to the core air flowpath 32. As such, and as noted above, it will be appreciated that each cavity of the plurality of air cavities 190, 194, 196, 198 defines a cavity pressure when the gas turbine engine is at an operating condition. Further, each air cavity of the plurality of air cavities 190, 194, 196, 198 is in airflow communication with the core air flowpath 32, through the outer drum 152, at a location within the core air flowpath 32 defining a flowpath pressure when the gas turbine engine is at the same operating condition, less than the cavity pressure of the respective air cavity. The operating condition may be a cruise operating condition, a maximum operating condition, etc. For example, when the operating condition is a maximum operating condition (i.e., with the turbofan engine 10 is operating at a rated speed), the cavity pressure may be a maximum cavity pressure (i.e., a pressure within the respective air cavity during operation of the turbofan engine 10 at a rated speed), and the flowpath pressure may be a maximum flowpath pressure (i.e., a pressure at the location within the core air flowpath 32 during operation of the turbofan engine 10 at a rated speed).

For example, the first air cavity 190 is in airflow communication with the core air flowpath 32, through the first opening 216 in the outer drum 152, at a location upstream of the intermediate speed HP compressor rotor blades 90 of the fifth ISHP stage assembly 162 and downstream of the intermediate speed HP compressor rotor blades 90 of the fourth ISHP stage assembly 160. As such, the maximum cavity pressure within the first air cavity 190 may be greater than the maximum flowpath pressure of the core air flowpath 32 at such location.

Similarly, the second air cavity 194 is in airflow communication with the core air flowpath 32, through the second opening 218 in the outer drum 152, at a location upstream of intermediate speed HP compressor rotor blades 90 of the fourth ISHP stage assembly 160 and downstream of the intermediate speed HP compressor rotor blades 90 of the third ISHP stage assembly 158. As such, the maximum cavity pressure within the second air cavity 194 may be greater than the maximum flowpath pressure of the core air flowpath 32 at such location.

The third air cavity 196 is in airflow communication with the core air flowpath 32, through the third opening 220 in the outer drum 152, at a location upstream of intermediate speed HP compressor rotor blades 90 of the third ISHP stage assembly 158 and downstream of the intermediate speed HP compressor rotor blades 90 of the second ISHP stage assembly 156. As such, the maximum cavity pressure within the third air cavity 196 may be greater than the maximum flowpath pressure of the core air flowpath 32 at such location.

The fourth air cavity 198 is in airflow communication with the core air flowpath 32, through the fourth opening 222 in the outer drum 152, at a location upstream of intermediate speed HP compressor rotor blades 90 of the second ISHP stage assembly 156 and downstream of the intermediate speed HP compressor rotor blades 90 of the first ISHP stage assembly 154. As such, the maximum cavity pressure of the core air flowpath 32 within the fourth cavity may be greater than the maximum flowpath pressure at such location.

Additionally, the fifth air cavity 200 is in airflow communication with the core air flowpath 32, through the fifth opening 224 in the outer drum 152, at a location upstream of intermediate speed HP compressor rotor blades 90 of the first ISHP stage assembly 154 and downstream of the forward-most intermediate speed HP compressor rotor blades 90A. As such, the maximum cavity pressure within the cavity may be greater than the maximum flowpath pressure of the core air flowpath 32 at such location.

Figure 7:
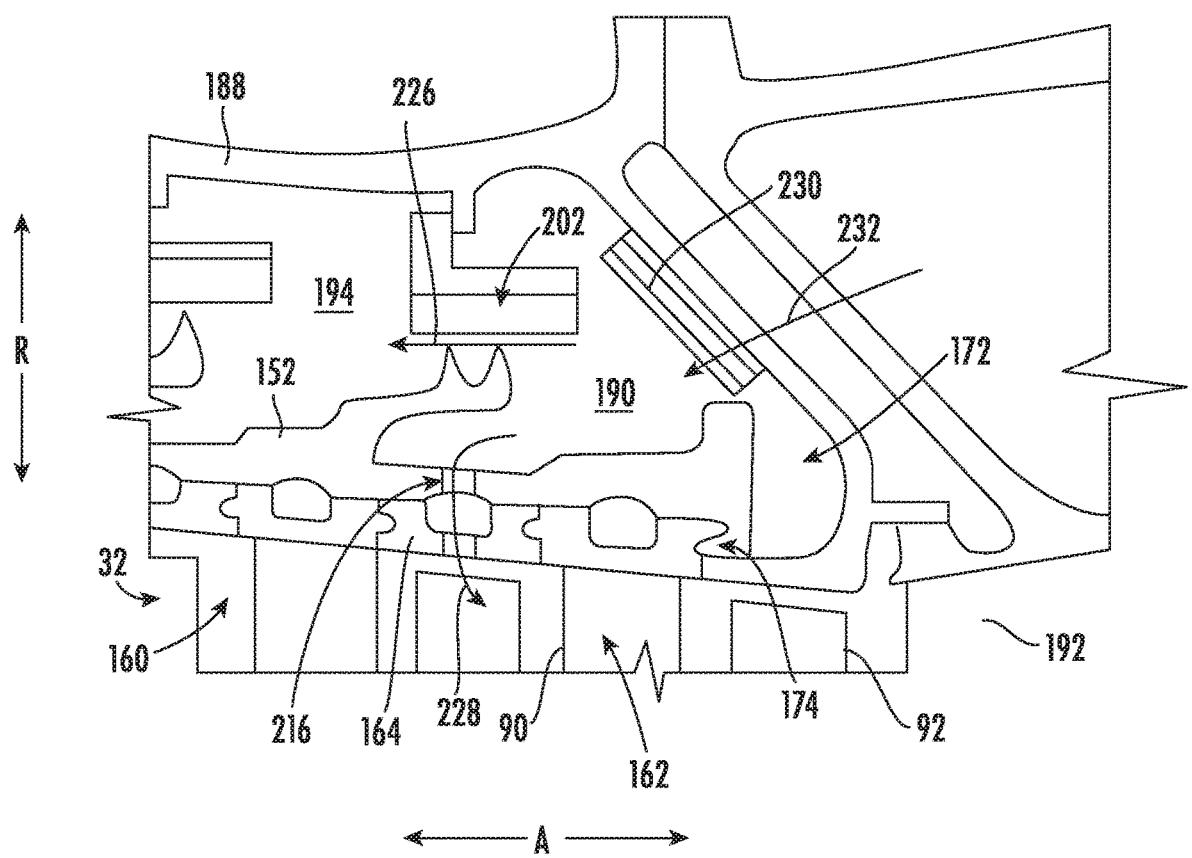
FIG. 7 is a close-up, schematic, cross-sectional view of a downstream end of the high pressure compressor of FIG. 5.

Further, referring still to FIG. 6, and now also to FIG. 7, providing a close-up view of the first and second air cavities 190, 192 and the first airflow seal 202, it will be appreciated that the turbofan engine 10 defines an airflow leakage ratio for each air cavity. More specifically, with reference to the first air cavity 190, the turbofan engine 10 defines a first airflow leakage rate from the first air cavity 190, through the first airflow seal 202, to the second air cavity 194 (as indicated by arrow 226). The turbofan engine 10 further defines a second airflow leakage rate from the first air cavity 190 through the outer drum 152 (such as through the first opening(s) 216 of the outer drum 152), to the core air flowpath 32 (as indicated by arrow 228). The airflow leakage ratio for the first air cavity 190 is a ratio of the first airflow leakage rate to the second airflow leakage rate. The airflow leakage ratio for the first air cavity 190 may be between about 5:95 and about 95:5 during operation of the turbofan engine 10 (such as at a rated speed). For example, in at least certain exemplary aspects, the airflow leakage ratio for the first air cavity 190 may be between about 10:90 and about 90:10, or between about 25:75 and about 75:25.

Moreover, it will be appreciated that each of the other air cavities 194, 196, 198, 200 may also define an airflow leakage ratio similar to the airflow leakage ratio the first air cavity 190 (i.e., a ratio of a leakage rate of its respective downstream seal and a leakage rate through the opening(s) of the respective section of the outer drum 152).

Briefly, referring still to FIG. 7, it will be appreciated that in at least certain exemplary aspects, the exemplary turbofan engine 10 depicted further includes a heat exchanger 230 in thermal communication with the first air cavity 190, a compressor discharge pressure airflow 232, or both. The heat exchanger 230 may reduce a temperature of an airflow within or to the first air cavity 190. The heat exchanger 230 may be any suitable heat exchanger 230 for extracting heat from the airflow within or to the first air cavity 190. For example, the heat exchanger 230 may be an air-to-air heat exchanger in airflow communication with, e.g., a bypass passage 54 of the turbofan engine 10, a cooling airflow within engine, etc. Alternatively, the heat exchanger 230 may be a liquid-to-air heat exchanger in fluid communication with, e.g., a lubrication oil system of the turbofan engine 10, a thermal transfer bus of the turbofan engine 10, etc. Further, it will be appreciated that although the heat exchanger 230 is positioned within the first air cavity 190 in the embodiment of FIG. 7, in other embodiments, the heat exchanger 230 may be located at any suitable location, such as external to the first air cavity 190 and/or turbomachine 16. For example, the heat exchanger 230 may instead be positioned in a bypass airflow passage of the engine (see, e.g., passage 54 in FIG. 1). With such an embodiment the source of air to the first air cavity 190 may be routed to such heat exchanger 230 and returned to the first air cavity 190. The control of such airflow may be actively controlled (e.g., based on one or more gas turbine engine operating conditions) or passively controlled (e.g., based on a discharge pressure, etc.).

Further, referring now back to FIG. 5, it will be appreciated that in at least certain exemplary embodiments, such as the exemplary embodiment depicted, the turbofan engine 10 further includes a bleed assembly 234 in airflow communication with an air cavity of the plurality of air cavities 190, 194, 196, 198 for receiving a bleed airflow from such air cavity. More specifically, for the embodiment shown, the bleed assembly 234 is in airflow communication with the second air cavity 194 for receiving a bleed airflow 236 from the second air cavity 194. However, in other embodiments, the bleed assembly 234 may be in airflow communication with any other suitable air cavity of the plurality of air cavities 190, 194, 196, 198, and further may be in airflow communication with two or more of the plurality of air cavities 190, 194, 196, 198. The bleed airflow 236 may be utilized, e.g., as customer bleed, turbine bleed, etc.

Utilizing a gas turbine engine configured in such a manner may allow for the gas turbine engine to capture airflow leakage from, e.g., the compressor of the compressor section of the gas turbine engine, and efficiently contain such airflow and reintroduce such airflow into the gas turbine engine for increasing efficiency of the gas turbine engine.

It will be appreciated, however, that the exemplary airflow management assembly, including, the plurality of cavities, seals, etc., is provided by way of example only. In other exemplary embodiments, the airflow management assembly may have any other suitable number of cavities, seals, etc. Further, in other embodiments, the cavities may have any other suitable size, may span across multiple stages of rotor blades, they include multiple cavities per stage of rotor blades, etc.

Further, it will be appreciated that although the exemplary airflow management assembly is depicted within the HP compressor 26 of the compressor section, in other embodiments, aspects of the present disclosure may be incorporated into any other suitable compressor of the compressor section. Further, referring now briefly to FIG. 8, it will be appreciated that in still other exemplary embodiments, aspects the present disclosure may be incorporated into a turbine within the turbine section of the gas turbine engine.

Figure 8:
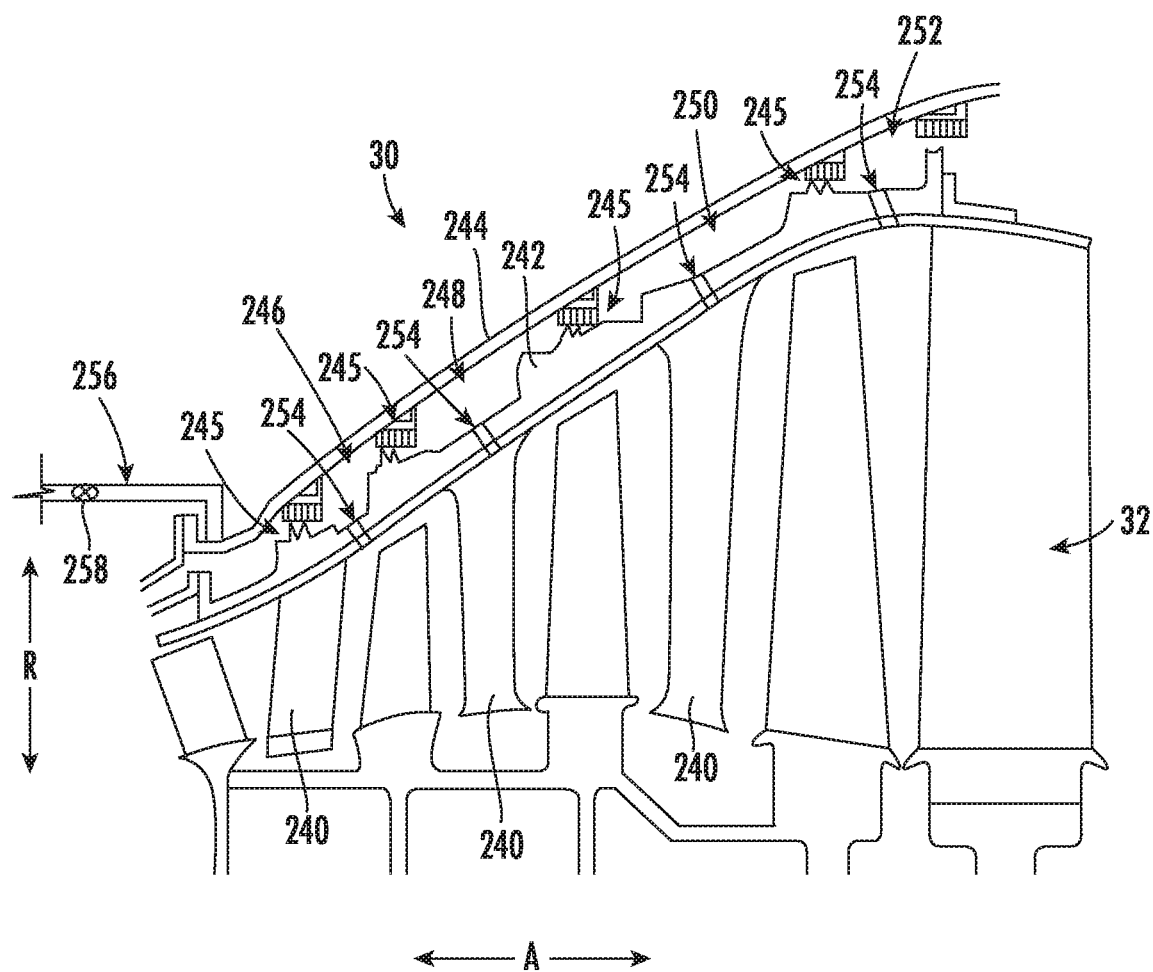
FIG. 8 is a close-up, schematic, cross sectional view of a low pressure turbine in accordance with an exemplary embodiment of the present disclosure.

FIG. 8 generally depicts an LP turbine 30 in accordance with an exemplary aspect of the present disclosure, including an airflow management assembly. The airflow management assembly of the LP turbine 30 of FIG. 8 may be configured in a similar manner as the exemplary airflow management assembly of the HP compressor 26 discussed above with reference to FIGS. 5 through 7. For example, the exemplary airflow management assembly of the LP turbine 30 depicted includes a plurality of first speed LP turbine rotor blades 240 arranged in a plurality of stages along the axial direction A. A outer drum 242 (which may be similar to outer drum 152) encloses the plurality of first speed LP turbine rotor blades 240. An outer casing 244 surrounds the outer drum 242 and defines a plurality of air cavities with the outer drum 242. Additionally, the outer drum 242 and outer casing 244 together form a plurality of airflow seals 245 position between adjacent air cavities of the plurality of air cavities. For the embodiment shown, the plurality of air cavities includes a first air cavity 246, a second air cavity 248, a third air cavity 250, and a fourth air cavity 252. Each air cavity in the plurality of air cavities 246-252 defines a pressure less than a pressure of an immediately upstream air cavity of the plurality of air cavities 246-252 during operation of the turbofan engine 10. Additionally, the first air cavity 246 and subsequent air cavities of the plurality of air cavities 246-252 of FIG. 8 may receive a compressor bleed airflow from, e.g., the compressor section of the turbofan engine 10. For example, the first air cavity 246 may receive compressor bleed airflow from the HP compressor 26. The bleed air through the plurality of air cavities 246-252 of FIG. 8 may be reintroduced into the core air flowpath 32 in a similar manner as discussed above (e.g., through a plurality of openings 254 in the outer drum 242). The compressor bleed air may be provided through one or more bleed air circuits 256, which may include one-way valves 258, such as check-valves, to prevent or reduce a likelihood of any back-flow under adverse seal openings/closings, etc.

It will further be appreciated that in at least certain exemplary embodiments, the airflow management assembly discussed herein may additionally, or alternatively, be incorporated into, e.g., an HP turbine, an intermediate pressure turbine, etc. Further, the airflow management assembly may receive a high pressure airflow from any other suitable source, such as an external source, such as the turbine section, etc. In such an exemplary embodiment, the airflow management assembly may further include additional heat exchangers to reduce a temperature of such airflow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Further, components described herein and shown in the Figures are of one embodiment, and in other embodiments may be included with other suitable component. As such, it should be appreciated that no group of components described herein and depicted in the Figures is inextricably linked unless expressly disclosed as such.

What is claimed is:

1. A gas turbine engine defining an axial direction, a radial direction, and a circumferential direction, the gas turbine engine comprising:
a compressor and a turbine;
a plurality of rotor blades positioned in the compressor or the turbine and arranged in a plurality of stages along the axial direction;
an outer drum positioned at least partially radially outward of the plurality of rotor blades and rotatable with the plurality of rotor blades; and
a casing extending over the outer drum and defining a plurality of air cavities with the outer drum,
wherein the plurality of air cavities are arranged in series airflow communication along the axial direction,
wherein the compressor and the turbine together define at least in part a core air flowpath,
wherein one or more of the air cavities of the plurality of air cavities is in airflow communication with the core air flowpath through the outer drum, and
wherein a pressure in each of the plurality of air cavities is higher than a pressure in the core air flowpath disposed directly on a radial inner side thereof.

2. The gas turbine engine of claim 1, wherein each air cavity defines a pressure less than a pressure of an immediately upstream air cavity during operation of the gas turbine engine.

3. The gas turbine engine of claim 1,
wherein each air cavity of the plurality of air cavities is in airflow communication with the core air flowpath through the outer drum.

4. The gas turbine engine of claim 3,
wherein each air cavity of the plurality of air cavities defines a cavity pressure during operation of the gas turbine engine at an operating condition, and
wherein each air cavity of the plurality of air cavities is in airflow communication with the core air flowpath at a location defining a flowpath pressure during operation of the gas turbine engine at the operating condition that is less than the maximum cavity pressure of the respective air cavity.

5. The gas turbine engine of claim 1,
wherein the outer drum and the casing together form a plurality of airflow seals,
wherein each airflow seal of the plurality of airflow seals is positioned between adjacent air cavities of the plurality of air cavities.

6. The gas turbine engine of claim 5, wherein each airflow seal comprises a plurality of labyrinth seals coupled to or formed with the outer drum and a corresponding seal land coupled to or formed with the casing.

7. The gas turbine engine of claim 5, wherein each airflow seal of the plurality of airflow seals defines a pressure ratio greater than 1:1 and less than 4:1.

8. The gas turbine engine of claim 7,
wherein the plurality of rotor blades are positioned within the compressor, and
wherein the compressor defines a compressor pressure ratio of at least about 2:1 and up to about 20:1.

9. The gas turbine engine of claim 5,
wherein the compressor and the turbine together define at least in part a core air flowpath,
wherein each air cavity of the plurality of air cavities is in airflow communication with the core air flowpath through the outer drum,
wherein each air cavity defines a first airflow leakage from the air cavity through an airflow seal of the plurality of airflow seals,
wherein each air cavity further defines a second airflow leakage from the air cavity through the outer drum to the core air flowpath,
wherein each cavity further defines a ratio of the first airflow leakage to the second airflow leakage between about 10:90 and 90:10 during operation of the gas turbine engine.

10. The gas turbine engine of claim 1,
wherein the plurality of rotor blades is positioned within the compressor,
wherein the plurality of air cavities includes an upstream-most air cavity, and
wherein the upstream-most air cavity is in airflow communication with the compressor for receiving a compressor discharge pressure airflow.

11. The gas turbine engine of claim 10, further comprising:
a heat exchanger in thermal communication with the upstream-most air cavity, the compressor discharge pressure airflow, or both, for reducing a temperature of an airflow within or to the upstream-most air cavity.

12. The gas turbine engine of claim 1,
wherein the plurality of rotor blades are arranged in at least two stages of rotor blades along the axial direction, and
wherein the plurality of air cavities comprises at least two air cavities.

13. The gas turbine engine of claim 1, further comprising:
a bleed assembly in airflow communication with an air cavity of the plurality of air cavities for receiving a bleed airflow from the air cavity.

14. The gas turbine engine of claim 1,
wherein the plurality rotor blades is a plurality of first speed rotor blades, and
wherein the gas turbine engine further comprises:
a plurality of second speed rotor blades, and
wherein the plurality of first speed rotor blades are alternatingly spaced with the plurality of second speed rotor blades.

15. The gas turbine engine of claim 1,
wherein the plurality of rotor blades define a radially outer end, and
wherein the plurality of rotor blades of each stage of the plurality of stages are coupled at their respective radially outer ends.

16. The gas turbine engine of claim 1,
wherein the plurality of rotor blades is positioned within the turbine,
wherein the plurality of air cavities includes an upstream-most air cavity, and
wherein the gas turbine engine includes a bleed air circuit in airflow communication with the upstream-most air cavity and the compressor, and
wherein the bleed air circuit includes a one-way valve.

17. An airflow management assembly for a gas turbine engine comprising a compressor, a turbine, and a plurality of rotor blades positioned in the compressor or the turbine and arranged in a plurality of stages, the gas turbine engine further defining an axial direction, a radial direction, and a circumferential direction, the airflow management assembly comprising:
an outer drum configured to be positioned around the plurality of rotor blades and rotatable with the plurality of rotor blades; and
a casing extending over the outer drum and defining a plurality of air cavities with the outer drum,
wherein the plurality of air cavities are arranged in series airflow communication along the axial direction,
wherein the drum defines a plurality of openings,
wherein each opening is in airflow communication with one of the plurality of air cavities, and
wherein a pressure in each of the plurality of air cavities is higher than a pressure in an air flowpath disposed directly on a radial inner side thereof.

18. The airflow management assembly of claim 17,
wherein the outer drum and the casing together form a plurality of airflow seals,
wherein each airflow seal of the plurality of airflow seals is positioned between adjacent air cavities of the plurality of air cavities.

* * * * *